United States Patent
Farhang et al.

(10) Patent No.: US 7,047,026 B1
(45) Date of Patent: May 16, 2006

(54) ASSIGNMENT OF NUMBER TO MOBILE STATION THAT ALLOWS CONNECTION TO THE MOBILE STATION OF CALL THAT EMPLOYS THE NUMBER

(75) Inventors: Bijan Farhang, Naperville, IL (US); John J. MacNamara, Orland Park, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 386 days.

(21) Appl. No.: 09/689,991

(22) Filed: Oct. 13, 2000

(51) Int. Cl.
*H04Q 7/20* (2006.01)
*H04Q 7/38* (2006.01)

(52) U.S. Cl. ............... 455/459; 455/458; 455/422.1; 455/550.1; 455/551; 455/456.1; 455/455; 455/414.1

(58) Field of Classification Search ........... 455/459, 455/456, 406, 407, 408, 550, 564, 432, 422, 455/461, 414, 445, 517, 552.1, 550.1, 551, 455/553.1, 556.1, 557, 403, 422.1, 426.1, 455/426.2, 435.1, 500, 460, 456.1, 432.1, 455/458, 417, 414.1
See application file for complete search history.

(56) References Cited

U.S. PATENT DOCUMENTS

| | | | | |
|---|---|---|---|---|
| 5,918,172 A * | 6/1999 | Saunders et al. | ........ | 455/404.1 |
| 6,161,012 A * | 12/2000 | Fenton et al. | ........... | 455/564 |
| 6,192,234 B1 * | 2/2001 | Chavez, Jr. | ............. | 455/414 |
| 6,195,558 B1 * | 2/2001 | Griffith et al. | .......... | 455/456 |
| 6,424,840 B1 * | 7/2002 | Fitch et al. | ............. | 455/456 |
| 6,490,449 B1 * | 12/2002 | Thibert et al. | .......... | 455/461 |
| 6,526,272 B1 * | 2/2003 | Bansal et al. | ........... | 455/406 |

* cited by examiner

*Primary Examiner*—Keith Ferguson

(57) ABSTRACT

A controller component of one embodiment of a system assigns a first number to a mobile station that upon location of the mobile station at a first location allows connection to the mobile station of a call that employs the first number. A controller component of the system assigns a second number to the mobile station that upon location of the mobile station at a second location allows connection to the mobile station of a call that employs the second number. The second number differs from the first number. The second location differs from the first location. In another embodiment, a controller component of a system assigns to a mobile station a number that upon location of the mobile station at any one or more of a temporary user zone and a base user zone allows connection to the mobile station of a call that employs the number. A controller component of the system selects the number to comprise fewer than seven digits.

21 Claims, 2 Drawing Sheets

ASSIGNMENT OF NUMBER TO MOBILE STATION THAT ALLOWS CONNECTION TO THE MOBILE STATION OF CALL THAT EMPLOYS THE NUMBER

TECHNICAL FIELD

The invention in one embodiment relates generally to telecommunications and more particularly to call connection to a mobile station.

BACKGROUND

One system employs a normal business telephone number to reach a mobile station of a mobile subscriber in all user zones and public areas. For example, a caller dials the normal business number to reach the mobile station in a business user zone, a home user zone, one or more temporary user zones, and one or more public areas.

As one shortcoming, such a system allows any caller that knows the normal business number of the mobile station to reach the mobile subscriber in all locations. In one example, the mobile subscriber desires to receive calls from only a select group of potential callers when the mobile subscriber is located in a temporary user zone that comprises a conference location or a vacation location. Nevertheless, such a system undesirably allows all callers that know the normal business number of the mobile station to reach the mobile subscriber even in the temporary user zone.

Thus, a need exist for increased selectivity in allowing connection of calls to a mobile station at a particular location.

SUMMARY

Pursuant to one embodiment of the invention, shortcomings of the existing art are overcome and additional advantages are provided through the provision of assignment of a number to a mobile station that allows connection to the mobile station of a call that employs the number.

The invention in one embodiment encompasses a method. A first number is assigned to a mobile station that upon location of the mobile station at a first location allows connection to the mobile station of a call that employs the first number. A second number is assigned to the mobile station that upon location of the mobile station at a second location allows connection to the mobile station of a call that employs the second number. The second number differs from the first number. The second location differs from the first location.

Another embodiment of the invention encompasses a system. The system includes a controller component that assigns a first number to a mobile station that upon location of the mobile station at a first location allows connection to the mobile station of a call that employs the first number. The system includes a controller component that assigns a second number to the mobile station that upon location of the mobile station at a second location allows connection to the mobile station of a call that employs the second number. The second number differs from the first number. The second location differs from the first location.

A further embodiment of the invention encompasses an article. The article includes a computer-readable signal-bearing medium. The article includes means in the medium for assigning a first number to a mobile station that upon location of the mobile station at a first location allows connection to the mobile station of a call that employs the first number. The article includes means in the medium for assigning a second number to the mobile station that upon location of the mobile station at a second location allows connection to the mobile station of a call that employs the second number. The second number differs from the first number. The second location differs from the first location.

An additional embodiment of the invention encompasses a method. A number is assigned to a mobile station that upon location of the mobile station at any one or more of a temporary user zone and a base user zone allows connection to the mobile station of a call that employs the number. The number is selected to comprise fewer than seven digits.

Yet another embodiment of the invention encompasses a system. The system includes a controller component that assigns to a mobile station a number that upon location of the mobile station at any one or more of a temporary user zone and a base user zone allows connection to the mobile station of a call that employs the number. The system includes a controller component that selects the number to comprise fewer then seven digits.

A still further embodiment of the invention encompasses an article. The article includes a computer-readable signal-bearing medium. The article includes means in the medium for assigning to a mobile station a number that upon location of the mobile station at any one or more of a temporary user zone and a base user zone allows connection to the mobile station of a call that employs the number. The article includes means in the medium for selecting the number to comprise fewer then seven digits.

These and other features and advantages of one embodiment of the invention will become apparent from the following detailed description, the accompanying drawings, and the claims.

DETAILED DESCRIPTION

In one embodiment of the invention, first and second different numbers are assigned to a mobile station. The first number, upon location of the mobile station at a first location, allows connection to the mobile station of a call that employs the first number. The second number, upon location of the mobile station at a second location different from the first location, allows connection to the mobile station of a call that employs the second number.

In another embodiment of the invention, a number selected to comprise fewer than seven digits is assigned to a mobile station. The number, upon location of the mobile station at any one or more of a temporary user zone and a base user zone, allows connection to the mobile station of a call that employs the number.

A detailed discussion of one example of the invention is presented herein, for illustrative purposes.

Figure 1:
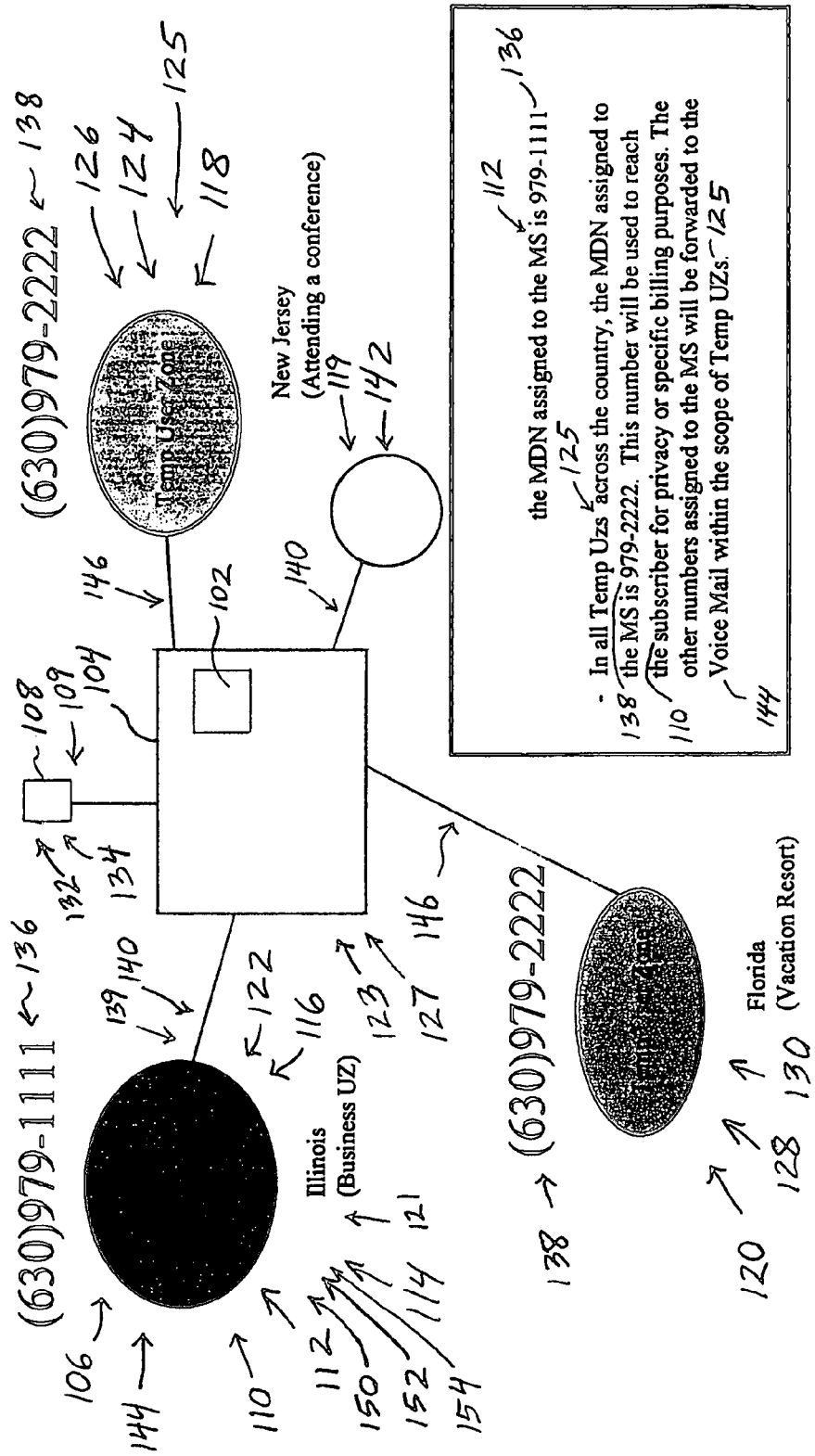
FIG. 1 is a functional block diagram of one example of a system that includes a plurality of different locations for a mobile station and a plurality of different numbers for the mobile station.

Turning to FIG. 1, system 100, in one example, includes a plurality of components such as computer software and/or hardware components. A number of such components can be combined or divided in one example of system 100. System 100 in one example employs at least one computer-readable signal-bearing medium. One example of a computer-readable signal-bearing medium for system 100 comprises an instance of recordable data storage medium 102 such as one or more of a magnetic, optical, biological, and atomic data storage medium. In another example, a computer-readable signal-bearing medium for system 100 comprises a modulated carrier signal transmitted over a network comprising or coupled with system 100, for instance, one or more of a telephone network, a local area network ("LAN"), the Internet, and a wireless network. An exemplary component of system 100 employs and/or comprises a series of computer instructions written in or implemented with any of a number of programming languages, as will be appreciated by those skilled in the art.

Referring again to FIG. 1, system 100 in one example comprises one or more components, for example, controller 104, user 106, and caller 108. Controller 104 in one example comprises a mobile switching center ("MSC") and/or a service provider. User 106 in one example comprises mobile station 110 and/or operator 112. Mobile station 110 in one example comprises a wireless telephone and/or a cellular telephone. Operator 112 in one example comprises a mobile subscriber ("MS") and/or a human operator.

Further referring to FIG. 1, user 106 in one example occupies any one of a plurality of instances of location 114. Exemplary instances of location 114 comprise locations 116, 118, 119, and 120. Locations 116, 118, 119, and 120 in one example comprise noncontiguous locations.

Referring still to FIG. 1, one or more instances of location 114 in one example comprise an instance of user zone 121. User zone 121 in one example comprises a geographical location for which controller 104 offers a special billing rate, for example, billing rate 123, and/or a specific set of features, for instance, private dialing plan, as described herein. In one example, controller 104 defines one or more instances of user zone 121.

Again referring to FIG. 1, in one example, an instance of location 114 comprises user zone 121. For example, user zone 121 comprises a room or hall in a corporate complex, academic campus, resort, hotel, or the like. In another example, a plurality of instances of location 114 comprise an instance of user zone 121. For example, user zone 121 comprises one or more of a corporate complex, academic campus, resort, hotel, and recreational, eating, and sleeping facility including, for instance, buildings, rooms, walkways, streets, parks, courts, lots, and the like.

Further referring to FIG. 1, controller 104 in one example employs a discounted billing rate such as billing rate 123 in user zone 121. For example, controller 104 applies billing rate 123 for termination and/or origination of an instance of call 139 at any instance of location 114 that comprises user zone 121. Exemplary instances of user zone 121 comprise user zones 122, 124, and 128. User zones 122, 124, and 128 in one example comprise noncontiguous user zones. Billing rate 123 in one example comprises a discounted local or discounted long-distance billing rate. Exemplary instances of call 139 comprise calls 140, 146, and 206.

Again referring to FIG. 1, location 116 in one example comprises user zone 122. User zone 122 in one example comprises base user zone 150. Base user zone 150 in one example comprises business user zone 152 and/or home user zone 154. Business user zone 152 in one example comprises a user zone that user 106 occupies while operator 112, for example, works for a business organization, for instance, that has ownership rights to a plurality of instances of location 116 that comprise business user zone 152.

Referring further to FIG. 1, home user zone 154 in one example comprises a user zone that user 106 occupies as a residence or dwelling. In one example, user 106 occupies user zone 154 while operator 112, for example, employs a plurality of instances of location 116 that comprise home user zone 154 to engage in activities such as eating, sleeping, relaxing, socializing, and telecommuting, for instance, to business user zone 152.

Still referring to FIG. 1, location 118 in one example comprises user zone 124. User zone 124 in one example comprises an instance of temporary user zone 125. Temporary user zone 125 in one example comprises a user zone that user 106 infrequently and/or temporarily occupies. Exemplary instances of temporary user zone 125 comprise temporary user zones 126 and 130. Temporary user zones 126 and 130 in one example comprise noncontiguous temporary user zones, for example, that are noncontiguous with base user zone 150 and public area 142.

Referring further to FIG. 1, user zone 124 in one example comprises temporary user zone 126. Temporary user zone 126 in one example comprises a user zone that user 106 occupies while operator 112, for example, attends a conference that is located away from user zone 122. For example, temporary user zone 126 comprises a plurality of instances of location 118 that are distinct from base user zone 150 and that comprise a host site and/or city for a conference.

Still referring to FIG. 1, location 120 in one example comprises user zone 128. User zone 128 in one example comprises temporary user zone 130. Temporary user zone 130 in one example comprises a user zone that user 106 occupies while operator 112, for example, vacations away from user zone 122.

Further referring to FIG. 1, caller 108 in one example comprises station 132 and/or operator 134. Station 132 in one example comprises one or more of a wireline telephone, a wireless telephone, a cellular telephone, and a mobile telephone. Operator 134 in one example comprises one or more of a mobile subscriber ("MS"), a customer of the public switched telephone network ("PSTN"), and a human operator.

Referring again to FIG. 1, controller 104 in one example assigns numbers 136 and 138 to mobile station 112. Numbers 136 and 138 in one example comprise different numbers. In one example, numbers 136 and 138 comprise exemplary instances of a mobile directory number ("MDN").

Referring still to FIG. 1, number 136 in one example comprises a normal business number for mobile station 112. For example, operator 134 inputs number 136 to station 132 to place call 140 to user 106. Controller 104 in one example allows connection of call 104 from caller 108 to user 106 when user 106 occupies location 116 and/or user zone 122, or location 119 and/or public area 142.

Again referring to FIG. 1, public area 142 in one example comprises an area that is distinct from user zone 122 and temporary user zones 126 and 130. In one example, public area 142 is noncontiguous with locations 116, 118, and 120, user zones 122, 124, and 128, and temporary user zones 126 and 130. In one example, public area 142 comprises a plurality of instances of location 119 for which controller 104 applies a standard and/or normal billing rate such as billing rate 127.

For example, referring to FIG. 1, controller 104 applies billing rate 127 to call 140 that controller 104 connects from caller 108 to user 106 when user 106 is located in public area 142. Billing rate 127 in one example comprises a non-discounted local or non-discounted long-distance billing rate. In one example, billing rate 127 is greater than billing rate 123. For instance, controller 104 applies non-discounted long-distance charges to call 140 that controller 104 connects from caller 108 to user 106 when user 106 occupies public area 142.

Referring further to FIG. 1, controller 104 in one example advantageously disallows connection of call 140 to user 106 when user 106 occupies any of locations 118 and 120 and/or temporary user zones 126 and 130. For example, if user 106 occupies any one of temporary user zones 126 and 130 when caller 108 places call 140 that employs number 136, then controller 104 advantageously directs call 140 to voice mail 144 of user 106.

Still referring to FIG. 1, operator 134 in one example inputs number 138 to station 132 to place call 146 to user 106. Controller 104 in one example advantageously allows connection of call 146 to user 106 when user 106 occupies any one of locations 118 and 120. For example, controller 104 advantageously allows connection of call 146 from caller 108 to user 106 when user 106 occupies any one of temporary user zones 126 and 130. In a further example, controller 104 advantageously applies billing rate 123 to call 146 that controller 104 connects from caller 108 to user 106 when user 106 occupies any one of locations 118 and 120. In one example, billing rate 123 is less than billing rate 127. For instance, controller 104 applies discounted charges to call 146 that controller 104 connects from caller 108 to user 106 when user 106 occupies any one of locations 118 and 120. In a still further example, when user 106 occupies public area 142, controller 104 directs to voice mail 144 call 146 to user 106 from caller 108 that employs number 138.

Again referring to FIG. 1, controller 104 in one example advantageously allows only instances of call 139 that employ number 138 such as call 146 to be originated and/or terminated at instances of location 114 of instances of temporary user zone 125.

In one example, referring to FIG. 1, user 106 informs only a select group 109 of callers 108 of an availability of number 138 for employment to reach user 106 upon location in user zones 124 and 128. User 106 in one example desires privacy while user 106 is located in an instance of temporary user zone 125. Controller 104 in one example advantageously applies billing rate 123 to select group 109 of callers 108 for calling user 106 through employment of number 138 in call 146 to user 106 upon location of user 106 in an instance of temporary user zone 125. In another example, controller 104 desirably disallows caller 108 that employs number 136 in call 140 from disturbing user 106 when user 106 is located in an instance of temporary user zone 125.

Figure 2:
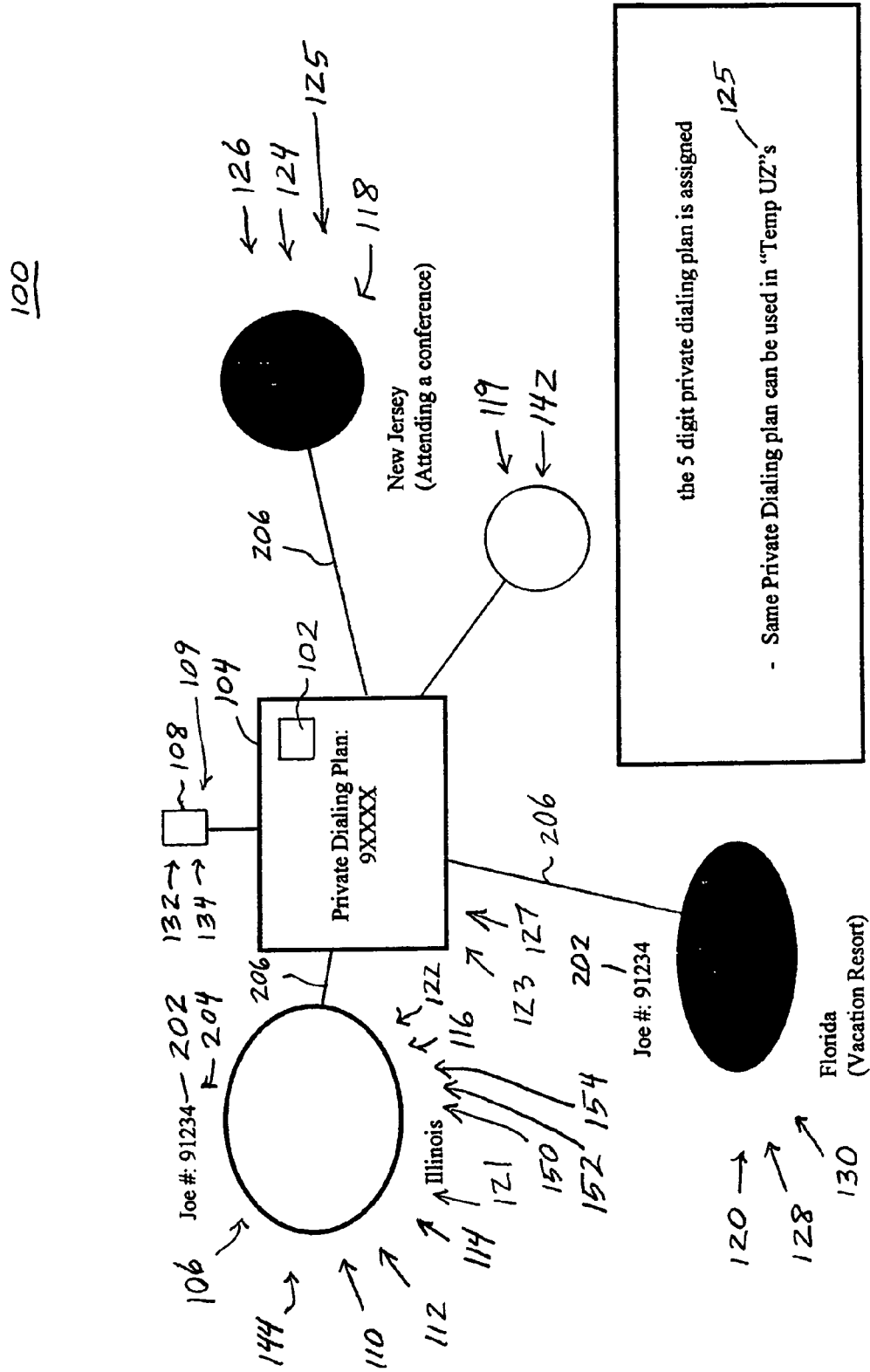
FIG. 2 is a functional block diagram of another example of the system of FIG. 1 that includes a number for the mobile station that comprises fewer than seven digits.

Turning to FIG. 2, number 202 in one example comprises a number having fewer than seven digits. For example, number 202 comprises abbreviated number 204. For instance, number 202 comprises a private dialing plan number that comprises, for example, one, two, three, four, five, or six digits.

Again referring to FIG. 2, operator 134 in one example inputs number 202 to station 132 to place an instance of call 139 such as call 206 to user 106. Controller 104 in one example allows connection of call 206 to user 106 when user 106 occupies a location in any one or more of user zones 122, 124, and 128. In a further example, controller 104 applies a discounted billing rate such as billing rate 123 to call 206 when user 106 occupies any one or more of instances of temporary user zone 125 such as temporary user zones 126 and 130.

Referring further to FIG. 2, when user 106 occupies public area 142, controller 104 in one example directs to voice mail 144 call 206 that employs number 202.

An illustrative description of one detailed example is now presented, for explanatory purposes.

Referring again to FIG. 1, in one example, user 106 comprises a subscriber, controller 104 comprises a service provider, mobile station 112 comprises a phone, number 136 comprises 630-979-1111, and number 138 comprises 630-979-2222. For example, the subscriber purchases the phone, the service provider assigns the numbers 630-979-1111 and 630-979-2222 to the phone of the subscriber, and the service provider defines one or more instances of user zone 121.

Still referring to FIG. 1, the number 630-979-1111 can be used to locate the subscriber all across a country, for example, the United States. The service provider can assign user zones (e.g., a plurality of instances of user zone 121) to the subscriber, and on a permanent basis add these user zones to a subscriber database of the service provider. If the subscriber is located in any of the user zones, then the subscriber can benefit from a specific billing rate and a set of features assigned to that user zone.

Further referring to FIG. 1, the service provider can define temporary user zones (e.g., a plurality of instances of temporary user zone 125) across the country for the purpose of conferences, vacations, and/or the like. For a specific subscriber, these temporary user zones in one example are assigned to the subscriber database of the service provider on a temporary basis. For example, the temporary user zones are not assigned to the subscriber database on a permanent basis for the specific subscriber. Upon request from the subscriber in areas in which these temporary user zones are available, the subscriber can take advantage of a temporary user zone on a temporary basis.

Again referring to FIG. 1, the number 630-979-2222 in one example can be assigned to the subscriber for use only within the temporary user zones. As a result, the subscriber can only be reached via 630-979-2222 within the scope of these temporary user zones. This provides them with privacy in receiving only selected calls while they are staying in the temporary user zones.

Referring still to FIG. 1, the number 630-979-1111 in one example can be used to reach the subscriber all over the country, except in the temporary user zones. Only the number 630-979-2222 can be used to reach the subscriber within the temporary user zones. If one tries to reach the subscriber located in a temporary user zone via 630-979-1111, then the call will be forwarded to voice mail 144 for the subscriber. In addition, if one tries to reach the subscriber via 630-979-2222 when the subscriber is outside a temporary user zone, then the call will be forwarded to voice mail 144 for the subscriber.

In a further example, referring to FIG. 2, a private dialing plan can be assigned to a user zone. For example, each permanent user zone and each temporary user zone for a subscriber can have a private dialing plan. The private dialing plan assigned to a temporary user zone can be the same as a private dialing plan assigned to a permanent user zone, or different from the private dialing plan assigned to a permanent user zone. These private dialing plans, for example, provide the subscriber with an ability to use abbreviated numbers for origination purposes.

The flow diagrams depicted herein are just exemplary. There may be many variations to these diagrams or the steps or operations described therein without departing from the spirit of the invention. For instance, the steps may be performed in a differing order, or steps may be added, deleted, or modified.

Although exemplary embodiments of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A method, comprising the steps of:
    assigning by a controller a permanent first and second numbers to a mobile station, wherein the numbers have fewer than seven digits;
    assigning by the controller permanent user zones to the mobile station;
    assigning by the controller temporary user zones to the mobile station;
    employing the first number when the mobile station is located in a first location in a respective permanent user zone of the permanent user zones, wherein the first number allows connection to the mobile station of a call that employs the first number; and
    employing the second number when the mobile station is located in a second location in a respective temporary user zone of the temporary user zones, wherein the second number allows connection to the mobile station of a call that employs the second number, and wherein the second number differs from the first number, and wherein the second location differs from the first location.

2. The method of claim 1, wherein the step of assigning the second number to the mobile station that upon location of the mobile station at the second location allows connection to the mobile station of the call that employs the second number comprises the step of selecting the second location to comprise a location that is noncontiguous with the first location.

3. The method of claim 1, wherein the step of assigning the first number to the mobile station that upon location of the mobile station at the first location allows connection to the mobile station of the call that employs the first number comprises the step of selecting the first number to correspond to a first user zone that comprises the first location; and
    wherein the step of assigning the second number to the mobile station that upon location of the mobile station at the second location allows connection to the mobile station of the call that employs the second number comprises the step of selecting the second number to correspond to a second user zone that comprises the second location, and wherein the second user zone differs from the first user zone.

4. The method of claim 1, wherein the step of assigning the second number to the mobile station that upon location of the mobile station at the second location allows connection to the mobile station of the call that employs the second number comprises the step of selecting a discounted billing rate for the call that employs the second number.

5. The method of claim 1, wherein the step of assigning the second number to the mobile station that upon location of the mobile station at the second location allows connection to the mobile station of the call that employs the second number comprises the step of selecting the second number to allow only calls that employ the second number to be, contemporaneously with location of the mobile station in a temporary user zone that comprises the second location, originated and/or terminated in the temporary user zone.

6. The method of claim 4, wherein the step of assigning the second number to the mobile station that upon location of the mobile station at the second location allows connection to the mobile station of the call that employs the second number comprises the step of assigning a particular number to the mobile station that upon location of the mobile station at any one of a plurality of locations allows connection to the mobile station of a call that employs the particular number, and wherein the particular number differs from the first number, wherein each location of the plurality of locations differs from the first location.

7. A method, comprising the steps of:
    assigning by a controller of a mobile switching center a permanent first and second numbers to a mobile station, wherein the numbers have fewer than seven digits;
    assigning by the controller of the mobile switching center permanent user zones to the mobile station;
    assigning by the controller of the mobile switching center temporary user zones to the mobile station;
    employing the first number when the mobile station is located in a first location in a respective permanent user zone of the permanent user zones, wherein the first number allows connection to the mobile station of a call that employs the first number; and
    employing the second number when the mobile station is located in a second location in a respective temporary user zone of the temporary user zones, wherein the second number allows connection to the mobile station of a call that employs the second number, and wherein the second number differs from the first number, and wherein the second location differs from the first location.

8. The method of claim 7, wherein the step of assigning the second number to the mobile station that upon location of the mobile station at the second location allows connection to the mobile station of the call that employs the second number comprises the step of selecting the second location to comprise a location that is noncontiguous with the first location.

9. The method of claim 7, wherein the step of assigning the first number to the mobile station that upon location of the mobile station at the first location allows connection to the mobile station of the call that employs the first number comprises the step of selecting the first number to correspond to a first user zone that comprises the first location; and
    wherein the step of assigning the second number to the mobile station that upon location of the mobile station at the second location allows connection to the mobile station of the call that employs the second number comprises the step of selecting the second number to correspond to a second user zone that comprises the second location, and wherein the second user zone differs from the first user zone.

10. The method of claim 7, wherein the step of assigning the second number to the mobile station that upon location of the mobile station at the second location allows connection to the mobile station of the call that employs the second number comprises the step of selecting a discounted billing rate for the call that employs the second number.

11. The method of claim 7, wherein the step of assigning the second number to the mobile station that upon location of the mobile station at the second location allows connection to the mobile station of the call that employs the second number comprises the step of selecting the second number to allow only calls that employ the second number to be, contemporaneously with location of the mobile station in a temporary user zone that comprises the second location, originated and/or terminated in the temporary user zone.

12. The method of claim 7, wherein the step of assigning the second number to the mobile station that upon location of the mobile station at the second location allows connection to the mobile station of the call that employs the second number comprises the step of directing to voice mail, upon location of the mobile station at the second location, a call that employs the first number.

13. The method of claim 7, wherein the step of assigning the second number to the mobile station that upon location of the mobile station at the second location allows connection to the mobile station of the call that employs the second number comprises the step of assigning a particular number to the mobile station that upon location of the mobile station at any one of a plurality of locations allows connection to the mobile station of a call that employs the particular number, and wherein the particular number differs from the first number, and wherein each location of the plurality of locations differs from the first location.

14. A method, comprising the steps of:
assigning to a mobile station at a location distinct from the mobile station, permanent first and second numbers, the numbers having fewer than seven digits;
assigning to the mobile station at a location distinct from the mobile station, permanent user zones;
assigning to the mobile station at a location distinct from the mobile station, temporary user zones;
employing the first number when the mobile station is located in a first location in a respective permanent user zone of the permanent user zones, wherein the first number allows connection to the mobile station of a call that employs the first number; and
employing the second number when the mobile station is located in a second location in a respective temporary user zone of the temporary user zones, wherein the second number allows connection to the mobile station of a call that employs the second number, and wherein the second number differs from the first number, and wherein the second location differs from the first location.

15. The method of claim 14, wherein the step of assigning to a mobile station at a location distinct from the mobile station, the permanent second number comprises the step of selecting the second location to comprise a location that is noncontiguous with the first location.

16. The method of claim 14, wherein the step of assigning to a mobile station at a location distinct from the mobile station, the permanent first number comprises the step of selecting the first number to correspond to a first user zone that comprises the first location; and
wherein the step of assigning to a mobile station at a location distinct from the mobile station, the permanent second number comprises the step of selecting the second number to correspond to a second user zone that comprises the second location, and wherein the second user zone differs from the first user zone.

17. The method of claim 14, wherein the step of assigning to a mobile station at a location distinct from the mobile station, the permanent second number comprises the step of selecting a discounted billing rate for the call that employs the second number.

18. The method of claim 14, wherein the step of assigning to a mobile station at a location distinct from the mobile station, the permanent second number comprises the step of selecting the second number to allow only calls that employ the second number to be, contemporaneously with location of the mobile station in a temporary user zone that comprises the second location, originated and/or terminated in the temporary user zone.

19. The method of claim 14, wherein the step of assigning to a mobile station at a location distinct from the mobile station, the permanent second number comprises the step of directing to voice mail, upon location of the mobile station at the second location, a call that employs the first number.

20. The method of claim 14, wherein the step of assigning to a mobile station at a location distinct from the mobile station, the permanent second number comprises the step of assigning a particular number to the mobile station that upon location of the mobile station at any one of a plurality of locations allows connection to the mobile station of a call that employs the particular number, and wherein the particular number differs from the first number, and wherein each location of the plurality of locations differs from the first location.

21. A method, comprising the steps of:
assigning by a controller a permanent first and second numbers to a mobile station, wherein the numbers have fewer digits than required to specify a telephone number having an area code, exchange code and station number;
assigning by the controller permanent user zones to the mobile station;
assigning by the controller temporary user zones to the mobile station;
employing the first number when the mobile station is located in a first location in a respective permanent user zone of the permanent user zones, wherein the first number allows connection to the mobile station of a call that employs the first number; and
employing the second number when the mobile station is located in a second location in a respective temporary user zone of the temporary user zones, wherein the second number allows connection to the mobile station of a call that employs the second number, and wherein the second number differs from the first number, and wherein the second location differs from the first location.

* * * * *